July 27, 1943.  W. VAN GUILDER  2,325,197
THERMOSTAT
Filed June 17, 1941
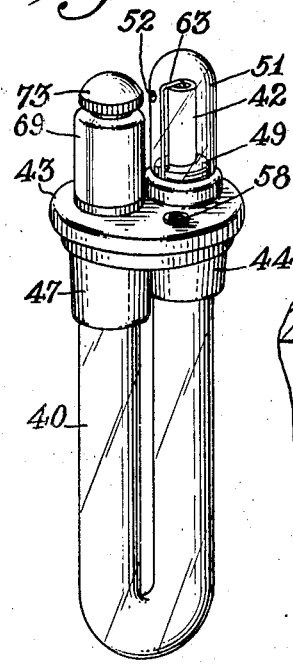
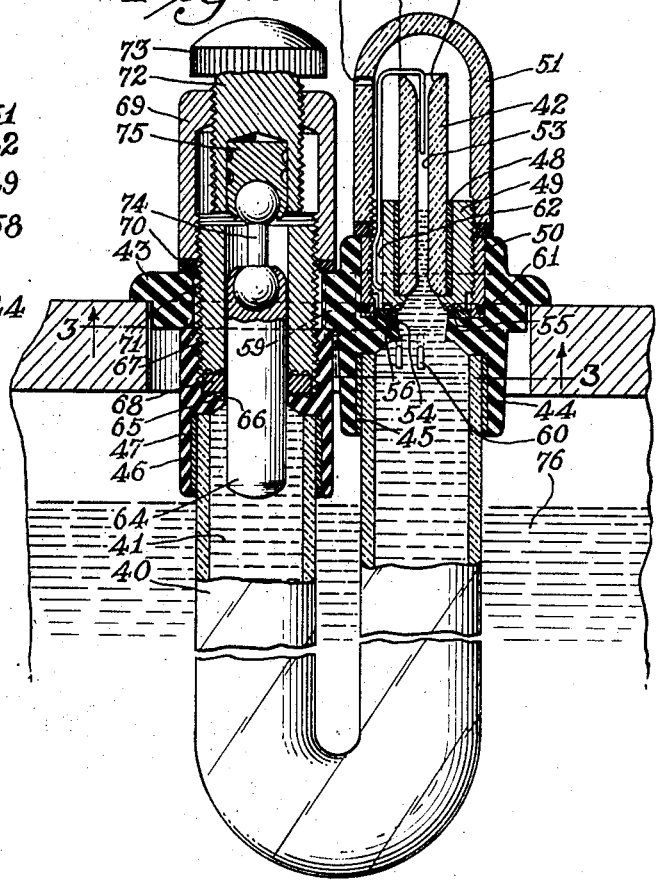
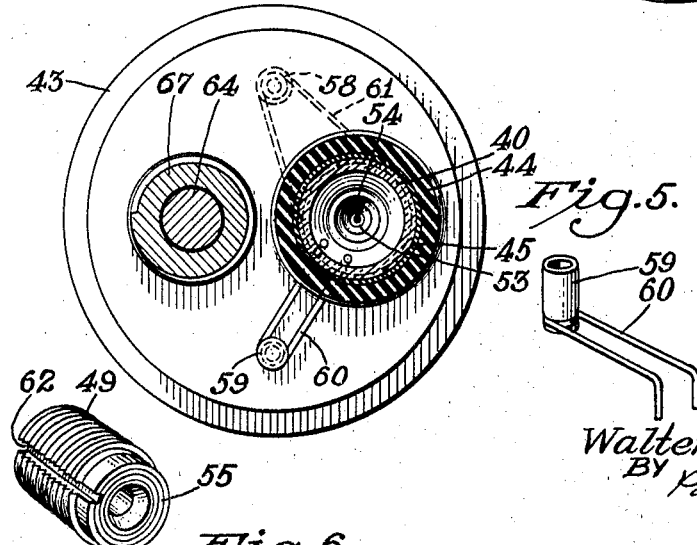
Inventor
Walter Van Guilder
BY Parker, Carlson,
Pitzner & Hubbard
Attorneys.

Patented July 27, 1943

2,325,197

UNITED STATES PATENT OFFICE 2,325,197

THERMOSTAT

Walter Van Guilder, River Forest, Ill., assignor to Precision Scientific Company, Chicago, Ill., a corporation of Illinois Application June 17, 1941, Serial No. 398,437

7 Claims. (Cl. 200—141)

The invention relates to thermostats, and more particularly to improvements in immersion thermostats of the general type used for regulating the temperature of baths or bodies of liquid and the like.

One general object of the invention is to provide a novel expansible liquid type thermostat of extreme precision. In fact, the instrument herein disclosed is capable of regulation control with a tolerance in temperature response of only ±0.03° F. throughout a range of more than 100° F.

Another object is to provide in an expansible liquid thermostat, an improved arrangement for adjusting the temperature setting thereof.

Another object is to provide a thermostat of the type indicated embodying a novel arrangement for sealing the same against entry of air into it and leakage of liquid out of the instrument.

Still another object of the invention is to provide a thermostat of the type indicated embodying a capillary tube in which the liquid is adapted to rise to make or break an electric circuit, and in which a novel construction for the capillary tube and mounting of the same is provided to facilitate its manufacture and insure precision operation.

A further object of the invention is to provide an expansible liquid thermostat embodying a novel construction and coordination of the parts, such as to afford maximum simplicity of construction together with accuracy of operation and long life even under severe conditions of usage.

Further objects and advantages of the invention will become apparent as the following description proceeds, taken in connection with the accompanying drawing, in which:

Figure 1 is a general perspective view of a thermostat embodying the invention.

Fig. 2 is an enlarged side elevation of the thermostat of Fig. 1, in place in a bath whose temperature it is to regulate, with the upper portion of the device shown in vertical section.

Fig. 3 is a transverse sectional view, taken substantially along the line 3—3 in Fig. 2.

Figs. 4 and 5 are detail perspective views of the electric terminals for the thermostat.

Fig. 6 is a detail perspective view of the mounting bushing for the capillary tube of the thermostat.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The particular form of thermostat illustrated (see Figs. 1 and 2) comprises a glass U-tube 40 containing a body of thermally expansive and electrically conductive liquid, such as mercury 41. A capillary tube 42 is provided at the end of one leg of the U so that the thread of mercury rising in it can be used as part of a sensitive electric circuit maker and breaker, while an adjustment mechanism is provided on the other leg of the U for adjustably varying the temperature setting of the device. The entire assembly is supported by a circular base plate 43 made of molded insulating material, such as Bakelite, and with the U-tube 40 depending beneath, for immersion in a bath of liquid whose temperature changes are utilized to actuate the thermostat.

In the present instance, the righthand leg of the U-tube 40 (as viewed in Fig. 2) is received in an integral bushing or cylindrical extension 44 on the base plate 43 and is permanently cemented in place therein, as indicated at 45. The other, or lefthand, leg of the U-tube is, however, cemented in a bore 46 in the lower end of the collar 47, which is structurally separate from the base plate 43. Although the collar 47 is supported from the base plate, in a manner hereinafter detailed, the lack of direct attachment of the lefthand leg of the U-tube to the base plate permits limited lateral movement of the leg of the U-tube relative to the base plate, particularly during the manufacture of the device. During manufacture, a suitable Bakelite cement is applied to the ends of the U-tube, and these ends are inserted respectively in the bushings 44 and 47. Then, prior to the assembly of the rest of the instrument, the parts 40, 44 and 47 are placed in an oven and baked at a suitable temperature to harden the cement. Even if there are any inequalities in expansion, due to disparity of the coefficients of thermal expansion Bakelite which forms the bushings and base plate and the glass of the U-tube, the permitted movement of the bushing 47 relative to the base plate accommodates any such inequalities in the expansion and contraction so that the glass tube will not be broken.

As to the details of the assembly, on the righthand leg of the U-tube (Fig. 2), it will be observed that the capillary tube 42 is cemented, as indicated at 48, in a moulded plastic ring or bushing 49. This bushing is threaded in a metal collar 50 molded in the base plate 43. Communication between the interior of the U-tube 40 and a capillary bore 53 in the capillary tube is established through an opening 54 in the base plate 43. Upon referring to Fig. 2, it will be observed that the lower end of the bore 53 in the capillary tube is flared outwardly and that the opening in the bottom of the bushing 49 is complementally flared. In this way, a gradually tapering throat is formed between the interior of the U-tube 40 and the bore 53 in the capillary tube. Such a gradually and gently tapering throat is of importance because, if there is an abrupt change in cross-section at this point, the thread of mercury in the capillary tube bore will be broken upon a recession of the column of mercury in the main U-tube.

An effectual seal between the capillary tube assembly (comprised of parts 53 and 49) and the U-tube, is effected by means of a yieldable packing or sealing washer 56. Desirably, this washer is made of synthetic rubber, commonly sold under the trade name Neoprene, since this material has the necessary characteristics of resiliency and compressibility for effectual sealing and does not deteriorate in the presence of oil, heat or air. The washer 56 is compressed between the lower end of the bushing 49 and the opposed face of the base plate 43 as the bushing is threaded down into the collar 50. Annular grooves 55 (see Fig. 6) are provided in the lower end face of the bushing 49 so as to aid in properly compressing the sealing washer 56.

A cup-shaped closure cap 51, made of transparent molded plastic or the like, is threaded on the upper end of the bushing 49 and serves to enclose the capillary tube while still permitting the user a full view of the same (see Fig. 1). This cap is apertured at 52 so that the pressure in the interior of the cap will be atmospheric.

A critical proportioning of the parts of the instrument, thus far described, is important in obtaining the degree of precision of operation contemplated for the present instrument. A rise or fall of the mercury in the capillary bore 53 of the order of 0.003 inch is, I have found, sufficient to make or break an electrical circuit at this point. The capillary bore is desirably of 1.25 mm. in diameter. Accordingly, a volume of about 0.000006 cubic inch of mercury is displaced in the capillary tube bore in making or breaking a circuit. The sensitivity of the instrument depends upon the ratio of the volume of mercury thus displaced to that contained in the main U-tube 40. I have found that for the desired degree of sensitivity, the ratios of these volumes should be of the order of one to a million. In the illustrated instrument, the U-tube 40 is designed to contain approximately 2.5 cubic inches of mercury so that the ratio of the volume displaced in the capillary bore to that contained in the U-tube is 0.0000024.

The use of an extremely small bore 53 in the capillary tube is also of importance in obtaining maximum sensitivity. I have found that when using mercury in a glass tube, 1.25 mm. is substantially the minimum diameter that can be used for the bore, and that a further diminution to even 1 mm. causes the thread of mercury in the bore to be ruptured as it rises and falls. Glass tubing which is sold commercially as 1 mm. tubing has, in fact, a bore diameter of 1.25 mm. and is suitable for use in the disclosed thermostat. The mounting arrangement for the capillary tube above described is particularly suited for the use of such standard tubing. In fabricating the device, a short length of this standard tubing, of the order of about an inch in length, is used. In order to flare its ends, to the form shown in Fig. 2, the builder heats an intermediate portion of the tubing, blows a bubble in the heated portion, and then cuts the tube off in the bubble.

The mounting arrangement for the capillary tube illustrated has the further advantage that it is unnecessary to fuse any additional glass connecting part to the lower end of the capillary tube. In other words, the sealing of the capillary tube to the U-tube is accomplished by means of a part secured exteriorly to the capillary tube, namely, the bushing 49, and this bushing is secured to the base plate (to which the U-tube is also fixed) rather than directly to the U-tube. In this way, the danger of constricting the bore in the capillary tube at its lower end, which danger would be present if a stopper-head or the like were fused to it, is obviated. It will be understood that any such constriction, even though very small (i. e. of the order of even a fraction of a mm.) would be likely to cause rupture of the thread of mercury as it rises and falls in the capillary bore. It is also necessary, for proper operation, that the bore 53 in the capillary tube be extremely smooth, since even fine scratches or abrasions will cause the thread of mercury to stick or break as it tends to rise and fall.

With an instrument constructed as described above, it is possible to obtain extreme precision of operation. In fact, a temperature regulation can be maintained with a tolerance of only ±0.03° F. throughout a range of more than 100° F.; that is, from a room temperature of, say, 70° F. to 212° F.

The upper end of the bore 53 in the capillary tube is flared outwardly to form a funnel-shaped mouth on the tube, as indicated at 57. In this way, even a sudden surge of mercury up through the capillary tube bore will not cause the same to overflow, but instead the excess will be trapped in this mouth. This effectually takes care of the surges in the column of mercury which are likely to take place in the event that the instrument is suddenly immersed in a hot bath.

Two electric circuit terminals 58 and 59 are provided on the device, being molded in the base plate (see Figs. 1 and 3). From the terminal 59, a wire 60, wrapped around it and seated in an annular groove in the terminal, is arranged with its ends projecting into the body of mercury 41 in the U-tube 40 (see Figs. 2, 3 and 5). The other terminal 58 is connected by a wire 61 with the insert collar 50 in the base plate. Upon referring to Fig. 4, it will be seen that the wire 61 is arranged in peripheral grooves in the terminal and the collar, being in electrical contact with them. The bushing 49, threaded in the collar 50, is longitudinally slotted at 62 (see Figs. 2 and 6), and one end of a resilient metal wire 63 is lodged in this groove. The other, or upper end of the wire, is projected into the capillary bore 53, being hooked over the top of the capillary tube and forms a contact pin projecting into the bore of the latter. The lower end of the wire 63 is bent outwardly, as indicated in Fig. 2, so as to be lodged in good frictional and electrical contact with the collar 50. Thus, the upper end of the wire 63 constitutes a contact, adapted to be touched by a rising thread of mercury in the capillary tube bore, and a circuit is completed from this thread of mercury to the terminal 58 through the parts 63—50—61—58.

On the other, or lefthand, leg of the U-tube 40, a plunger 64 is arranged to be projected into the interior of the U-tube to displace the liquid therein and thus vary the temperature setting of the device by raising or lowering the thread of mercury displaced into the capillary tube bore 53. The plunger 64 is desirably made of polished stainless steel, accurately ground to size. A novel arrangement has been provided for sealing the entry bore for the plunger 64 so as to prevent leakage at this point. Furthermore, the lefthand leg of the U-tube 40 has been located slightly below the righthand leg. The resultant differentiation in height affords a pressure, resulting from the differential column of mercury, which excludes any air which might otherwise tend to leak along the plunger 64 into the interior of the U-tube. On the other hand, the upper ends of the two legs of the U-tube are close enough to each other in height that there is not an excessive head of mercury, which would otherwise tend to force the mercury outward past the plunger, and thus cause a serious hazard of liquid leakage.

As to the arrangement for sealing the plunger 64, it will be observed, upon referring to Fig. 2, that the plunger 64 projects through an accurately formed bore 66 in a centrally located partition 65 in the bushing 47. As was heretofore noted, this bushing 47 is fixed to the end of the U-tube. In the upper end of the bushing 47 is threaded a sleeve 67, loosely telescoped over the plunger. This sleeve 67 serves to compress a resilient packing, or washer, 68, encircling the plunger 64 so as to effectually seal the same against leakage of air or liquid through the bore 66. The washer 68, as in the case of the washer 56, is desirably made of neoprene, and the opposed faces of the partition 65 and sleeve 67 are annularly grooved to more effectually engage and compress the sealing washer.

The bushing 47 and sleeve 67 are secured to the base plate 43 by means of a lock nut 70 threaded on the sleeve 67. Also threaded on the sleeve 67 is a housing 69 of inverted cup shape.

An actuator stem 72, having a knob 73 thereon, is threaded in the upper end of the housing 69. This actuator stem 72 is connected to the plunger 64 by an intermediate member 74 of dumbbell shape (see Fig. 2), which is utilized in forming a self-alining or loose joint between the actuator stem and plunger. The utilization of such a connection between the actuator stem and plunger is of particular importance in the economical manufacture of the device, since it obviates the necessity of accurately alining the tapped hole in the housing 69, which receives the actuator stem, and the bore 66 in the bushing 47, which slidably receives the plunger 64. It will be appreciated by those skilled in the art that if the actuator stem and plunger were rigidly joined, the holes in question would have to be alined with extreme precision, particularly in view of the close fit of the plunger in the bore 66, and that this would be especially difficult in view of the fact that the holes in question are formed in two structurally separate members, namely, the housing 69 and bushing partition 65.

In the particular connecting arrangement shown between the plunger 64 and actuator stem 72, the ball on the lower end of the intermediate member 74 is received in a socket in the upper end of the plunger. The ball on the other or upper end of the intermediate member 74 is received in a corresponding socket in a member 75 fixed in a bore in the lower end of the actuator stem 72.

The mode of operation of the thermostat described will now be generally clear. By way of synopsis, it may be noted that the U-tube 40 is immersed in a bath 76 whose temperature is to control the operation of the thermostat. The adjusting knob 73 is turned in order to raise or lower the thread of mercury in the capillary bore 53, and thus adjust the temperature setting of the instrument with extreme precision to exactly the desired point. The conductors of the electric circuit to be controlled are attached to the terminals 58, 59. Thereafter, when the temperature of the bath 76 rises, the mercury in the U-tube 40 will be heated and will thus expand.

The expansion of this main body of mercury in the U-tube 40 causes the thread of mercury in the capillary tube bore 53 to rise, the displacement of mercury in the capillary tube bore being proportionate to the ratio of the volume displaced in the bore to the total volume in the main U-tube. Since in the present instance the ratio is of the order of one to a million, the expansion of the main body of mercury is multiplied by substantially that amount in the reflected displacement of the thread of mercury in the capillary tube so that even an extremely small change in the temperature of the bath 76, i. e. a change of the order of 0.03° F., will cause the thread of mercury in the capillary tube to rise sufficiently to touch the contact wire 63 and establish an electric circuit. When the thread of mercury does touch the contact wire 63, a circuit is established from the terminal 58 to the terminal 59 (through parts 53—61—50—63—41—60—59). When the temperature of the bath 76 drops by an equally small increment, i. e., about 0.03° F., the mercury in the U-tube 40 is cooled and contracted sufficiently that the thread of mercury in the capillary tube bore 53 recedes far enough to interrupt the circuit at the contact wire 63.

From the foregoing, it will be seen that a thermostat has been provided which, although very accurate and precise in operation, is readily adapted to large scale commercial production. It will be understood by those skilled in the art that the problems involved in a regulating type of instrument such as that here disclosed, are substantially different from, and greater than, those in, say, a temperature-responsive alarm in which but one expansion of mercury is contemplated during use. That is, if the mercury must rise and fall from time to time as here contemplated, in making and breaking a regulator circuit, the problem is encountered of a rising and falling thread of mercury in the capillary tube bore which must be accommodated without breakage of the thread. On the other hand, if but one rise of the thread is contemplated, as in a fire alarm device, there is little or no danger of thread breakage, even though the capillary tube bore be of a length wholly impractical in a regulator.

I claim as my invention:

1. In a thermostat, the combination of a U-tube adapted to contain a body of thermally expansive liquid, means adjacent the upper end of one leg of the tube for establishing an electric circuit upon a predetermined rise in the liquid in such leg, a member fixed to the other end of the tube having a bore therein opening into the tube, a plunger slidable in said bore, a yieldable packing member encircling the plunger at the upper end of said bore, a collar loosely encircling said plunger and threaded on said member to press said packing into tight sealing engagement with the plunger, and an actuator for adjustably moving said plunger axially.

2. In an immersion type thermostat, the combination of a U-tube adapted to contain a body of thermally expansive liquid and insertable into a medium to whose temperature the thermostat is to respond, a mounting plate extending transversely of the upper portion of the U-tube and fixed to an end thereof, and means for securing the other leg of the U-tube to said plate to depend therefrom while permitting limited lateral movement of the tube leg relative to the plate to accommodate a difference in coefficients of thermal expansion for the plate and tube.

3. In an immersion type thermostat, the combination of a U-shaped tubular structure adapted to contain a body of thermally expansive liquid and insertable into a medium to whose temperature the thermostat is to respond, a generally flat mounting plate extending transversely to the plane of the U-shaped structure and rigidly fixed to the upper end portion of one leg of the latter, said plate having an aperture therein through which the other leg of said U-shaped structure extends with ample clearance to permit lateral movement of said leg, and means including a retaining member removably fixed to the portion of said other leg extending above said aperture for suspending said other leg from said plate.

4. In a thermostat, the combination of a first tube structure having an upstanding end portion and adapted to contain a body of thermally expansive and electrically conductive liquid, a supporting plate having a bore therein in which said upstanding end portion of said first tube is inserted from the lower side of the plate and fixed therein, a second tube structure comprising a short straight length of glass capillary tube having a longitudinal bore therein of a diameter which is but a small fraction of the cross-sectional area of the interior of said first tube, said second tube structure also including a collar fixed to the exterior thereof, said supporting plate presenting an opening in its upper side constituting a continuation of said bore therein, said collar being threaded in said opening to position said capillary tube in substantial axial alinement with upstanding leg of said first tube, and an electrical contact disposed in said bore of said capillary tube to contact a thread of liquid rising therein from said first tube.

5. In a thermostat, the combination of a first tube structure having an upstanding end portion and adapted to contain a body of thermally expansive and electrically conductive liquid, a second tube structure having a capillary bore therein disposed in generally axial alinement with said upstanding end portion of the first tube, an electrical contact disposed for contact with liquid rising to a predetermined point in said capillary bore, a member rigidly fixed to said end of said first tube structure and having an opening therein establishing communication between said capillary bore and the interior of said first tube structure, said member presenting a shoulder bordering said opening, a resilient sealing member seated on said shoulder and encircling said opening, and means on said member threadably engaging said second tube structure for screwing of the same down tightly against said resilient sealing member, thereby to establish an effectually sealed but disengageable joint between said two tubular structures.

6. A thermostat comprising, in combination, a tube adapted to contain a body of thermally expansive and electrically conductive liquid, a second tube having a capillary bore therein of a cross-sectional area which is but a small fraction of that of the first mentioned tube, means structurally separate from said tubes fixing them together in axial alinement and defining a passage of gradually and gently diminishing cross-section between the interiors of said tubes, whereby upon thermal expansion and contraction of the body liquid in the first mentioned tube a thin thread of the same will respectively rise and fall in said capillary bore but without danger of separation of the thread from the main body of liquid at their juncture due to the gradual change in cross-section of said passage at such point, and means including an electrical contact disposed to contact the liquid which rises to a predetermined point in said capillary bore for establishing an electric circuit.

7. A thermostat comprising, in combination, a U-tube adapted to contain a body of thermally expansible and electrically conductive liquid and insertable into a medium to whose temperature the thermostat is to respond, a second tube fixed to and forming an upright extension of one leg of said U-tube and having a small capillary bore therein of the order of magnitude of 1.25 millimeters in diameter, a contact in said bore to establish a circuit with a thread of the liquid rising in said bore upon thermal expansion of the liquid in said U-tube, means including a plunger adjustably projectable into the other leg of the U-tube for adjusting the height of the thread of liquid in said bore, and the ratio of volumetric capacity of the U-tube to the volume of the liquid in said bore displaced in establishing a circuit with said contact being of the order of a million to one.

WALTER VAN GUILDER.